(12) United States Patent
T et al.

(10) Patent No.: US 12,179,624 B2
(45) Date of Patent: Dec. 31, 2024

(54) SYSTEMS AND METHODS FOR GUIDING VEHICLES TO CHARGING POINTS

(71) Applicant: Honeywell International Inc., Charlotte, NC (US)

(72) Inventors: Prem Kumar T, Bangalore (IN); Kalaiarasu Velappan, Bangalore (IN); Janakiram Thiyagarajan, Bangalore (IN); Gireesh Kumar R N, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 653 days.

(21) Appl. No.: 17/336,473

(22) Filed: Jun. 2, 2021

(65) Prior Publication Data

US 2022/0309931 A1 Sep. 29, 2022

(30) Foreign Application Priority Data

Mar. 23, 2021 (IN) .............................. 202111012467

(51) Int. Cl.
*B60L 53/65* (2019.01)
*B60L 53/36* (2019.01)
*B60L 58/13* (2019.01)

(52) U.S. Cl.
CPC .............. *B60L 53/65* (2019.02); *B60L 53/36* (2019.02); *B60L 58/13* (2019.02); *B60L 2200/10* (2013.01); *B60L 2240/60* (2013.01)

(58) Field of Classification Search
CPC ...... Y02T 90/12; B60L 53/36; B60L 2240/72; B60L 53/65; G01C 21/3632; G05D 1/0276; G05D 2201/0213; G05D 1/0278
See application file for complete search history.

(56) References Cited

U.S. PATENT DOCUMENTS

| | | | |
|---|---|---|---|
| 5,790,976 A * | 8/1998 | Boll ...................... | H02J 7/0048 701/25 |
| 8,232,763 B1 * | 7/2012 | Boot ....................... | B60L 50/66 320/137 |
| 9,412,279 B2 | 8/2016 | Kantor et al. | |
| 9,955,314 B1 * | 4/2018 | Bacarella .............. | H04W 4/029 |
| 10,107,634 B2 * | 10/2018 | You ........................ | B60L 58/12 |
| 10,166,880 B2 * | 1/2019 | Ueda .................... | G09B 29/003 |

(Continued)

FOREIGN PATENT DOCUMENTS

EP 2894436 A1 7/2015
WO 2017100579 A1 6/2017

*Primary Examiner* — Steven B Theriault
(74) *Attorney, Agent, or Firm* — Alston & Bird LLP

(57) ABSTRACT

Disclosed are methods, systems, and non-transitory computer-readable medium for determining guidance information for a vehicle. For instance, the method may include: determining whether the vehicle requires a charging event at least based on a state of charge of a battery system of the vehicle; determining a charging location of a charging station from a plurality of charging stations based on data associated with the vehicle and/or data associated with each of the plurality of charging stations; determining a current location of the vehicle; determining information to guide the vehicle from the current location to the determined charging location and align a charging interface of the vehicle to a charging interface of the charging location; and causing display of the determined information.

26 Claims, 10 Drawing Sheets

(56) References Cited

U.S. PATENT DOCUMENTS

| | | | |
|---|---|---|---|
| 10,618,653 B2 | 4/2020 | Han et al. | |
| 10,637,258 B2 | 4/2020 | Ando | |
| 10,640,105 B2 | 5/2020 | Hoffmann et al. | |
| 10,661,669 B1 | 5/2020 | Torok et al. | |
| 10,866,108 B2 | 12/2020 | Pedersen | |
| 2003/0006914 A1* | 1/2003 | Todoriki | B60L 53/64 701/423 |
| 2011/0224900 A1* | 9/2011 | Hiruta | G01C 21/3469 701/533 |
| 2011/0254504 A1* | 10/2011 | Haddad | B60L 53/37 320/109 |
| 2012/0019204 A1* | 1/2012 | Matsuo | B60L 53/60 320/109 |
| 2012/0109515 A1 | 5/2012 | Uyeki et al. | |
| 2012/0109519 A1* | 5/2012 | Uyeki | B60L 53/68 701/426 |
| 2013/0090936 A1* | 4/2013 | Solomon | G06Q 30/02 705/1.1 |
| 2013/0179057 A1* | 7/2013 | Fisher | B60L 53/66 701/1 |
| 2014/0039726 A1 | 2/2014 | Profitt-Brown et al. | |
| 2014/0163877 A1* | 6/2014 | Kiyama | G01C 21/3469 701/533 |
| 2015/0226572 A1 | 8/2015 | North et al. | |
| 2015/0298565 A1* | 10/2015 | Iwamura | G06Q 10/04 701/22 |
| 2015/0306969 A1* | 10/2015 | Sabripour | H02J 3/322 320/109 |
| 2017/0168493 A1* | 6/2017 | Miller | B60L 58/12 |
| 2017/0217319 A1* | 8/2017 | Araki | H02J 50/12 |
| 2017/0225581 A1* | 8/2017 | Chai | B60L 53/30 |
| 2017/0299401 A1* | 10/2017 | Choi | B60L 50/00 |
| 2018/0045533 A1* | 2/2018 | Jackson | G01C 21/3682 |
| 2018/0141450 A1* | 5/2018 | Oh | B60L 53/35 |
| 2018/0143029 A1* | 5/2018 | Nikulin | G01C 21/3415 |
| 2018/0143035 A1* | 5/2018 | Ricci | G01C 21/3469 |
| 2018/0202825 A1* | 7/2018 | You | B60L 53/305 |
| 2018/0281612 A1* | 10/2018 | Perry | H04W 4/80 |
| 2018/0304759 A1 | 10/2018 | Chase et al. | |
| 2018/0304761 A1* | 10/2018 | Chase | G05D 1/0225 |
| 2019/0047701 A1* | 2/2019 | Winkle | H02J 7/342 |
| 2019/0178663 A1* | 6/2019 | Mukai | G01C 21/34 |
| 2019/0204840 A1* | 7/2019 | Park | G01C 21/3667 |
| 2019/0217735 A1 | 7/2019 | Donnelly et al. | |
| 2019/0283623 A1* | 9/2019 | Takebayashi | B60R 21/01512 |
| 2019/0316924 A1* | 10/2019 | Morgan-Brown | G01C 21/3697 |
| 2019/0381908 A1* | 12/2019 | Joo | G08G 1/142 |
| 2019/0383637 A1* | 12/2019 | Teske | B60L 53/14 |
| 2020/0126322 A1* | 4/2020 | Kimura | G06F 16/29 |
| 2020/0139835 A1* | 5/2020 | Miler | B60L 53/63 |
| 2020/0217679 A1* | 7/2020 | DeLuca | G01C 21/3484 |
| 2020/0257317 A1* | 8/2020 | Musk | G05D 1/0033 |
| 2020/0262307 A1* | 8/2020 | Rosene | B60L 53/68 |
| 2020/0272400 A1* | 8/2020 | Yoshino | G06F 3/1431 |
| 2020/0398689 A1* | 12/2020 | Lewis | B60L 53/38 |
| 2021/0080282 A1* | 3/2021 | Goei | G01C 21/3679 |
| 2021/0122257 A1* | 4/2021 | Lee | B60L 53/62 |
| 2021/0276441 A1* | 9/2021 | Ben-David | B60L 53/36 |
| 2022/0024330 A1* | 1/2022 | Books | B60L 53/57 |
| 2022/0085626 A1* | 3/2022 | Singh | H02J 7/0048 |
| 2022/0172550 A1* | 6/2022 | Ahtikari | G07F 15/005 |
| 2022/0187091 A1* | 6/2022 | Suzuki | B60L 53/665 |
| 2022/0212691 A1* | 7/2022 | Mackenzie | B60L 53/36 |
| 2023/0211692 A1* | 7/2023 | Donaldson | G01C 21/3469 701/22 |
| 2023/0230062 A1* | 7/2023 | Lee | B60L 53/305 705/39 |

\* cited by examiner

SYSTEMS AND METHODS FOR GUIDING VEHICLES TO CHARGING POINTS

TECHNICAL FIELD

Various embodiments of the present disclosure relate generally to systems and methods for determining guidance information for vehicles and, more particularly, to systems and methods for determining guidance information for aerial vehicles.

BACKGROUND

Some urban air mobility (UAM) vehicles are electrically powered, e.g., electrically powered vertical take-off and landing (eVTOL) vehicles. Such vehicles require electrical charging in order to operate. Due to the various charging locations and charging interfaces, there is a need for a guidance system to guide a vehicle to a charging location.

The present disclosure is directed to overcoming one or more of these above-referenced challenges.

SUMMARY OF THE DISCLOSURE

According to certain aspects of the disclosure, systems and methods are disclosed for determining guidance information from vehicles.

For instance, a method may include determining, by one or more processors, whether the vehicle requires a charging event at least based on a state of charge of a battery system of the vehicle; as a result of determining that the vehicle requires the charging event, determining, by the one or more processors, a charging location of a charging station from a plurality of charging stations based on data associated with the vehicle and/or data associated with each of the plurality of charging stations; determining, by the one or more processors, a current location of the vehicle; determining, by the one or more processors, information to guide the vehicle from the current location to the determined charging location and align a charging interface of the vehicle to a charging interface of the charging location; and causing, by the one or more processors, display of the determined information.

A system may include a memory storing instructions; and a processor executing the instructions to perform a process. The process may include: determining whether the vehicle requires a charging event at least based on a state of charge of a battery system of the vehicle; as a result of determining that the vehicle requires the charging event, determining a charging location of a charging station from a plurality of charging stations based on data associated with the vehicle and/or data associated with each of the plurality of charging stations; determining a current location of the vehicle; determining information to guide the vehicle from the current location to the determined charging location and align a charging interface of the vehicle to a charging interface of the charging location; and causing display of the determined information.

A non-transitory computer-readable medium may store instructions that, when executed by a processor, cause the processor to perform a method. The method may include: determining whether the vehicle requires a charging event at least based on a state of charge of a battery system of the vehicle; as a result of determining that the vehicle requires the charging event, determining a charging location of a charging station from a plurality of charging stations based on data associated with the vehicle and/or data associated with each of the plurality of charging stations; determining a current location of the vehicle; determining information to guide the vehicle from the current location to the determined charging location and align a charging interface of the vehicle to a charging interface of the charging location; and causing display of the determined information.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to determining guidance information for vehicles.

In general, the present disclosure is directed to systems and methods for determining guidance information for aerial vehicles. Electrically powered UAM vehicles, such as eVTOL vehicles, need electrical charging to operate. There is limited time for charging such vehicles between missions and available space for the next vehicle landing. It may be difficult for an operator and/or flight crew to remember locations of charging points and how to align the UAM within each specific charging point. Accordingly, there is a need for an onboard systems and methods to provide location details of available charging points and guidance cues to align the vehicle with a charging point.

While this disclosure describes the systems and methods with reference to aircraft, it should be appreciated that the present systems and methods are applicable to determining guidance data for vehicles, including drones, automobiles, ships, or any other autonomous and/or Internet-connected vehicle.

Figure 1:
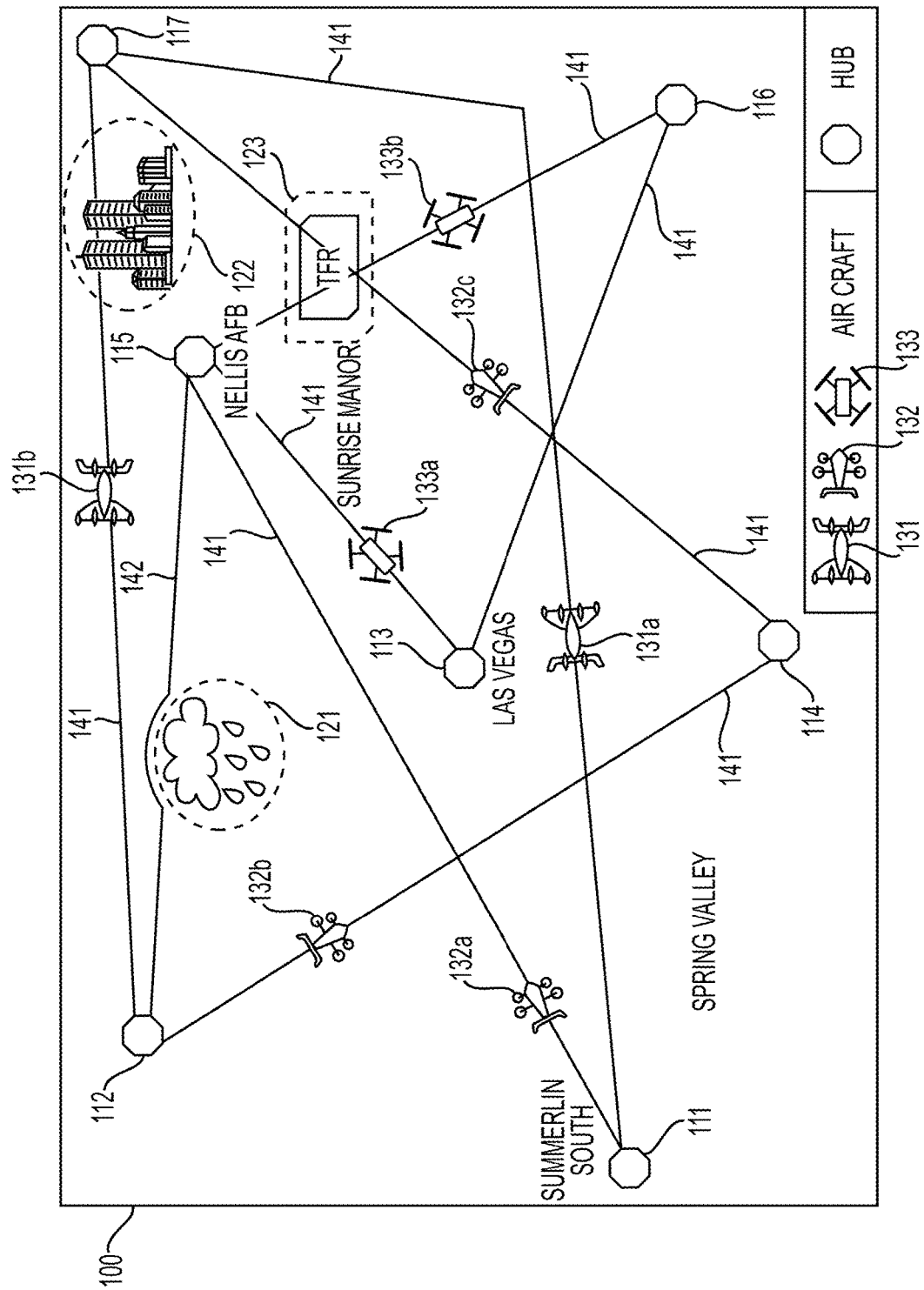
FIG. 1 depicts an example environment in which methods, systems, and other aspects of the present disclosure may be implemented.

As shown in FIG. 1, FIG. 1 depicts an example environment in which methods, systems, and other aspects of the present disclosure may be implemented. The environment of FIG. 1 may include an airspace 100 and one or more hubs 111-117. A hub, such as any one of 111-117, may be a ground facility where aircraft may take off, land, or remain parked (e.g., airport, vertiport, heliport, vertistop, helistop, temporary landing/takeoff facility, or the like). In some embodiments, each ground facility may include one or more parking locations. Some, or all, of the parking locations may include a charging station. The aircraft may initiate a charging event at such charging stations as will be described in further detail below. The airspace 100 may accommodate aircraft of various types 131-133 (collectively, "aircraft 131" unless indicated otherwise herein), flying at various altitudes and via various routes 141. An aircraft, such as any one of aircraft 131a-133b, may be any apparatus or vehicle of air transportation capable of traveling between two or more hubs 111-117, such as an airplane, a vertical take-off and landing aircraft (VTOL), a drone, a helicopter, an unmanned aerial vehicle (UAV), a hot-air balloon, a military aircraft, etc. Any one of the aircraft 131a-133b may be connected to one another and/or to one or more of the hubs 111-117, over a communication network, using a vehicle management computer corresponding to each aircraft or each hub. Each vehicle management computer may comprise a computing device and/or a communication device, as described in more detail below in FIGS. 3A and 3B. As shown in FIG. 1, different types of aircraft that share the airspace 100 are illustrated, which are distinguished, by way of example, as model 131 (aircraft 131a and 131b), model 132 (aircraft 132a, 132b, and 132c), and model 133 (aircraft 133a and 133b).

As further shown in FIG. 1, an airspace 100 may have one or more weather constraints 121, spatial restrictions 122 (e.g., buildings), and temporary flight restrictions (TFR) 123. These are exemplary factors that a vehicle management computer of an aircraft may be required to consider and/or analyze in order to derive the most safe and optimal flight trajectory of the aircraft. For example, if a vehicle management computer of an aircraft planning to travel from hub 112 to hub 115 predicts that the aircraft may be affected by an adverse weather condition, such as weather constraint 121, in the airspace, the vehicle management computer may modify a direct path (e.g., the route 141 between hub 112 and hub 115) with a slight curvature away from the weather constraint 121 (e.g., a northward detour) to form a deviated route 142.

As indicated above, FIG. 1 is provided merely as an example environment of an airspace that includes exemplary types of aircraft, hubs, zones, restrictions, and routes. Regarding particular details of the aircraft, hubs, zones, restrictions, and routes, other examples are possible and may differ from what was described with respect to FIG. 1. For example, types of zones and restrictions which may become a factor in trajectory derivation, other than those described above, may include availability of hubs, reserved paths or sky lanes (e.g., routes 141), any ground-originating obstacle which extends out to certain levels of altitudes, any known zones of avoidance (e.g., noise sensitive zones), air transport regulations (e.g., closeness to airports), etc.

Figure 2:
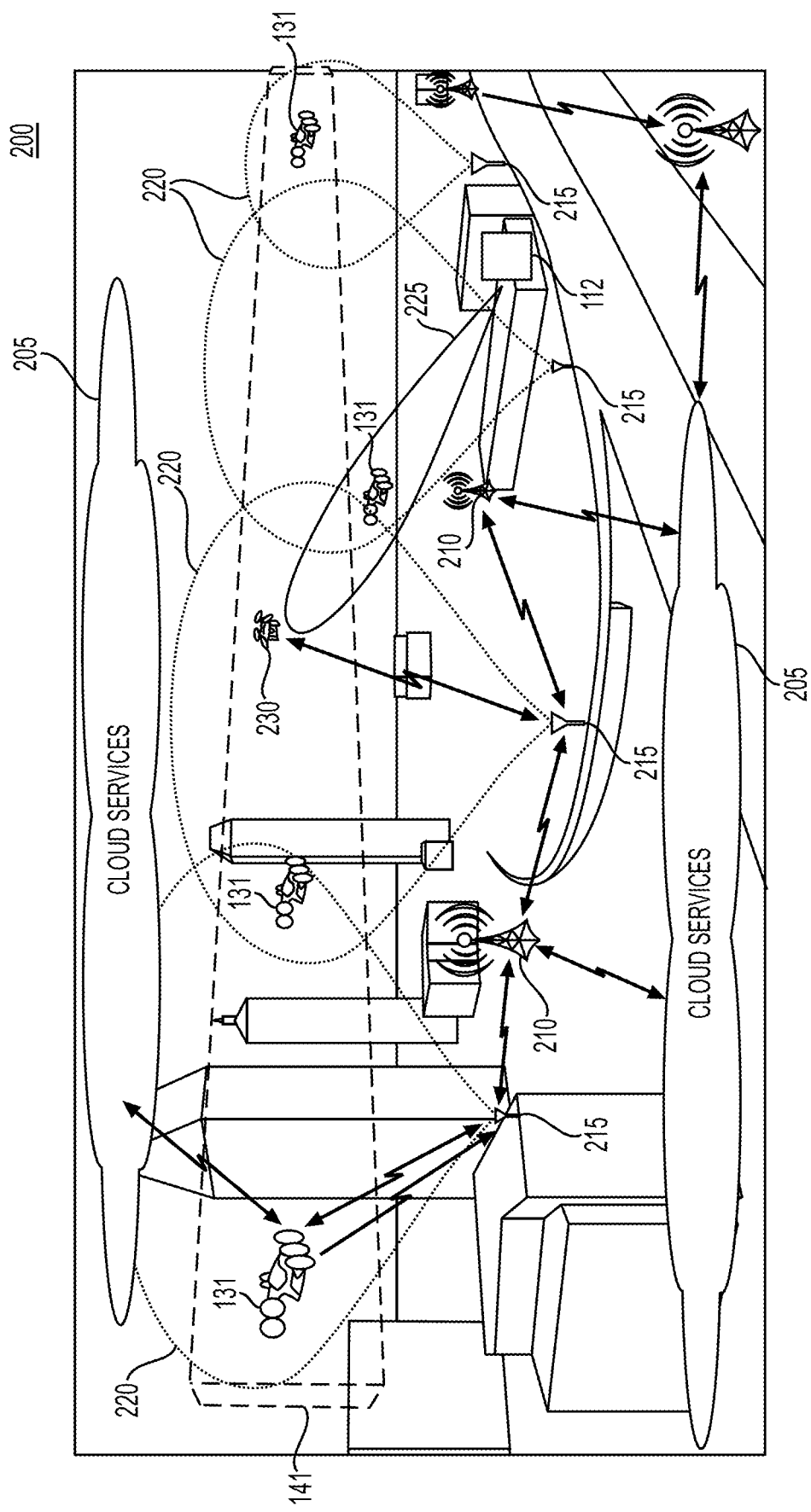
FIG. 2 depicts an exemplary a system, according to one or more embodiments.

FIG. 2 depicts an exemplary a system, according to one or more embodiments. The system 200 depicted in FIG. 2 may include one or more aircraft, such as aircraft 131, one or more intruder aircraft 230, a cloud service 205, one or more communications station(s) 210, and/or one or more ground station(s) 215. The one or more aircraft 131 may be traveling from a first hub (e.g., hub 114) to a second hub (e.g., hub 112) along a route of routes 141. Between, near, and/or on hubs, such as hubs 111-117, the one or more ground station(s) 215 may be distributed (e.g., evenly, based on traffic considerations, etc.) along/near/on/under routes 141. Between, near, and/or on hubs, such as hubs 111-117, the one or more communications station(s) 210 may be distributed (e.g., evenly, based on traffic considerations, etc.). Some (or all) of the one or more ground station(s) 215 may be paired with a communication station 210 of the one or more communications station(s) 210.

Each of the one or more ground station(s) 215 may include a transponder system, a radar system, and/or a datalink system.

The radar system of a ground station 215 may include a directional radar system. The directional radar system may be pointed upward (e.g., from ground towards sky) and the directional radar system may transmit a beam 220 to provide three-dimensional coverage over a section of a route 141. The beam 220 may be a narrow beam. The three-dimensional coverage of the beam 220 may be directly above the ground station 215 or at various skewed angles (from a vertical direction). The directional radar system may detect objects, such as aircraft 131, within the three-dimensional coverage of the beam 220. The directional radar system may detect objects by skin detection. In the case of the ground station 215 being positioned on a hub, such as the hub 112, the directional radar system may transmit a beam 225 to provide three-dimensional coverage over the hub 112. The beam 225 may be also be skewed at an angle (from a vertical direction) to detect objects arriving at, descending to, and landing on the hub 112. The beams 220/225 may be controlled either mechanically (by moving the radar system), electronically (e.g., phased arrays), or by software (e.g., digital phased array "DAPA" radars), or any combination thereof.

The transponder system of a ground station 215 may include an ADS-B and/or a Mode S transponder, and/or other transponder system (collectively, interrogator system). The interrogator system may have at least one directional antenna. The directional antenna may target a section of a route 141. For instance, targeting the section of the route 141 may reduce the likelihood of overwhelming the ecosystem (e.g., aircraft 131) with interrogations, as would be the case if the interrogator system used an omnidirectional antenna. The directional antenna may target a specific section of a route 141 by transmitting signals in a same or different beam pattern as the beam 220/225 discussed above for the radar system. The interrogator system may transmit interrogation messages to aircraft, such as aircraft 131, within the section of the route 141. The interrogation messages may include an identifier of the interrogator system and/or request the aircraft, such as aircraft 131, to transmit an identification message. The interrogator system may receive the identification message from the aircraft, such as aircraft 131. The identification message may include an identifier of the aircraft and/or transponder aircraft data (e.g., speed, location, track, etc.) of the aircraft.

If the radar system detects an object and the transponder system does not receive a corresponding identification message from the object (or does receive an identification message, but it is an invalid identification message, e.g., an identifier of un-authorized aircraft), the ground station 215 may determine that the object is an intruder aircraft 230. The ground station 215 may then transmit an intruder alert message to the cloud service 205. If the radar system detects an object and the transponder system receives a corresponding identification message from the object, the ground station 215 may determine the object is a valid aircraft. The ground station 215 may then transmit a valid aircraft message to the cloud service 205. Additionally or alternatively, the ground station 215 may transmit a detection message based on the detection of the object and whether the ground station 215 receives the identification message ("a response message"); therefore, the ground station 215 may not make a determination as to whether the detected object is an intruder aircraft or a valid aircraft, but instead send the detection message to the cloud service 205 for the cloud service 205 to determine whether the detected object is an intruder aircraft or a valid aircraft.

The datalink system of ground station 215 may communicate with at least one of the one or more communications station(s) 210. Each of the one or more communications station(s) 210 may communicate with at least one of the one or more ground station(s) 215 within a region around the communications station 210 to receive and transmit data from/to the one or more ground station(s) 215. Some or none of the communications station(s) 210 may not communicate directly with the ground station(s) 215, but may instead be relays from other communications station(s) 210 that are in direct communication with the ground station(s) 215. For instance, each of the ground station(s) 215 may communicate with a nearest one of the communications station(s) 210 (directly or indirectly). Additionally or alternatively, the ground station(s) 215 may communicate with a communications station 210 that has a best signal to the ground station 215, best bandwidth, etc. The one or more communications station(s) 210 may include a wireless communication system to communicate with the datalink system of ground station(s) 215. The wireless communication system may enable cellular communication, in accordance with, e.g., 3G/4G/5G standards. The wireless communication system may enable Wi-Fi communications, Bluetooth communications, or other short range wireless communications. Additionally or alternatively, the one or more communications station(s) 210 may communicate with the one or more of the one or more ground station(s) 215 based on wired communication, such as Ethernet, fiber optic, etc.

The one or more communications station(s) 210 may also communicate with one or more aircraft, such as aircraft 131, to receive and transmit data from/to the one or more aircraft. For instance, one or more communications station(s) 210 may relay data between the cloud service 205 and a vehicle, such as aircraft 131.

The cloud service 205 may communicate with the one or more communications station(s) 210 and/or directly (e.g., via satellite communications) with aircraft, such as aircraft 131. The cloud service 205 may provide instructions, data, and/or warnings to the aircraft 131. The cloud service 205 may receive acknowledgements from the aircraft 131, aircraft data from the aircraft 131, and/or other information from the aircraft 131. For instance, the cloud service 205 may provide, to the aircraft 131, weather data, traffic data, landing zone data for the hubs, such as hubs 111-117, updated obstacle data, flight plan data, etc. The cloud service 205 may also provide software as a service (SaaS) to aircraft 131 to perform various software functions, such as navigation services, Flight Management System (FMS) services, etc., in accordance with service contracts, API requests from aircraft 131, etc.

Figure 3A:
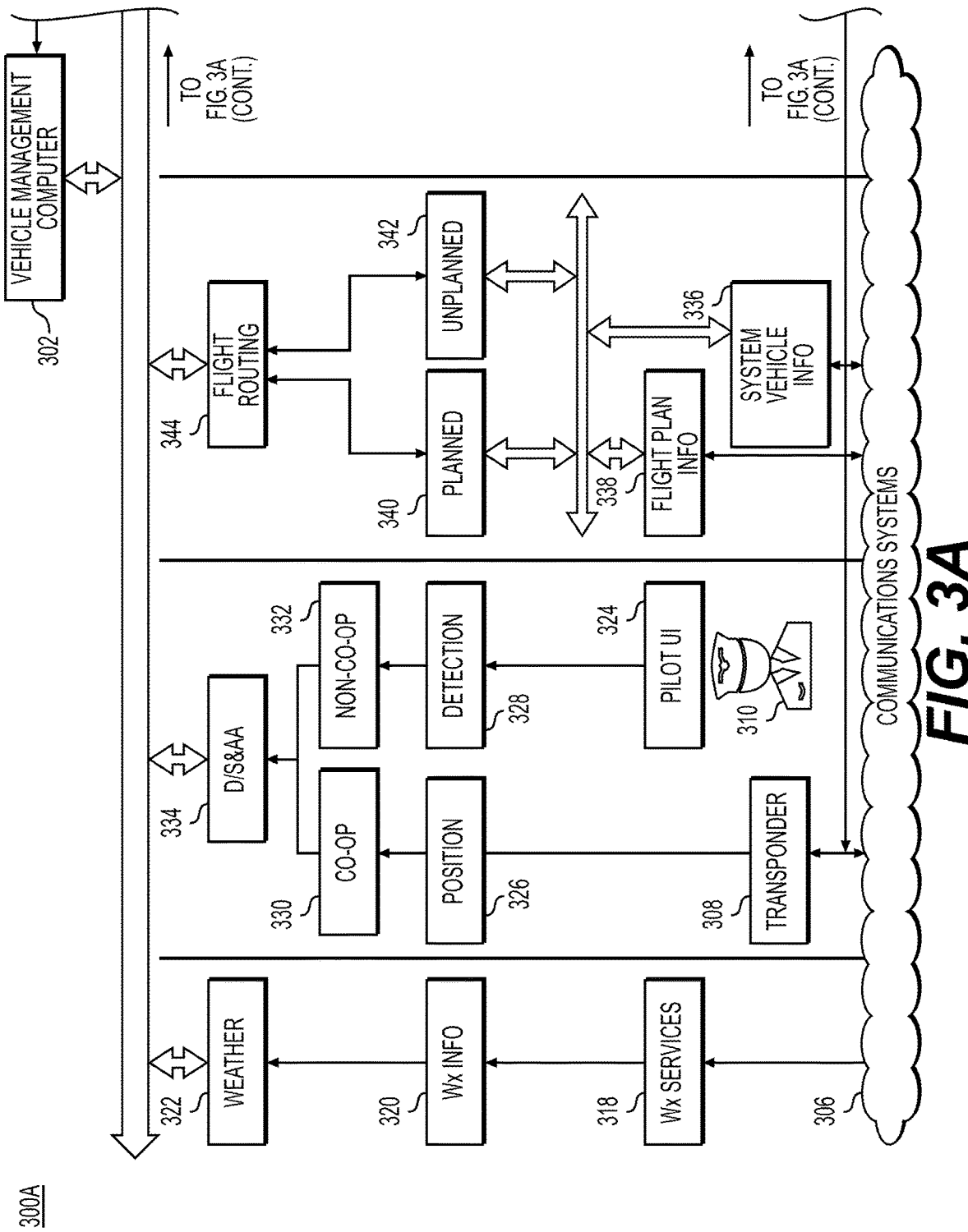
FIGS. 3A and 3B depict exemplary block diagrams of a vehicle of a system, according to one or more embodiments.
Figure 3A:
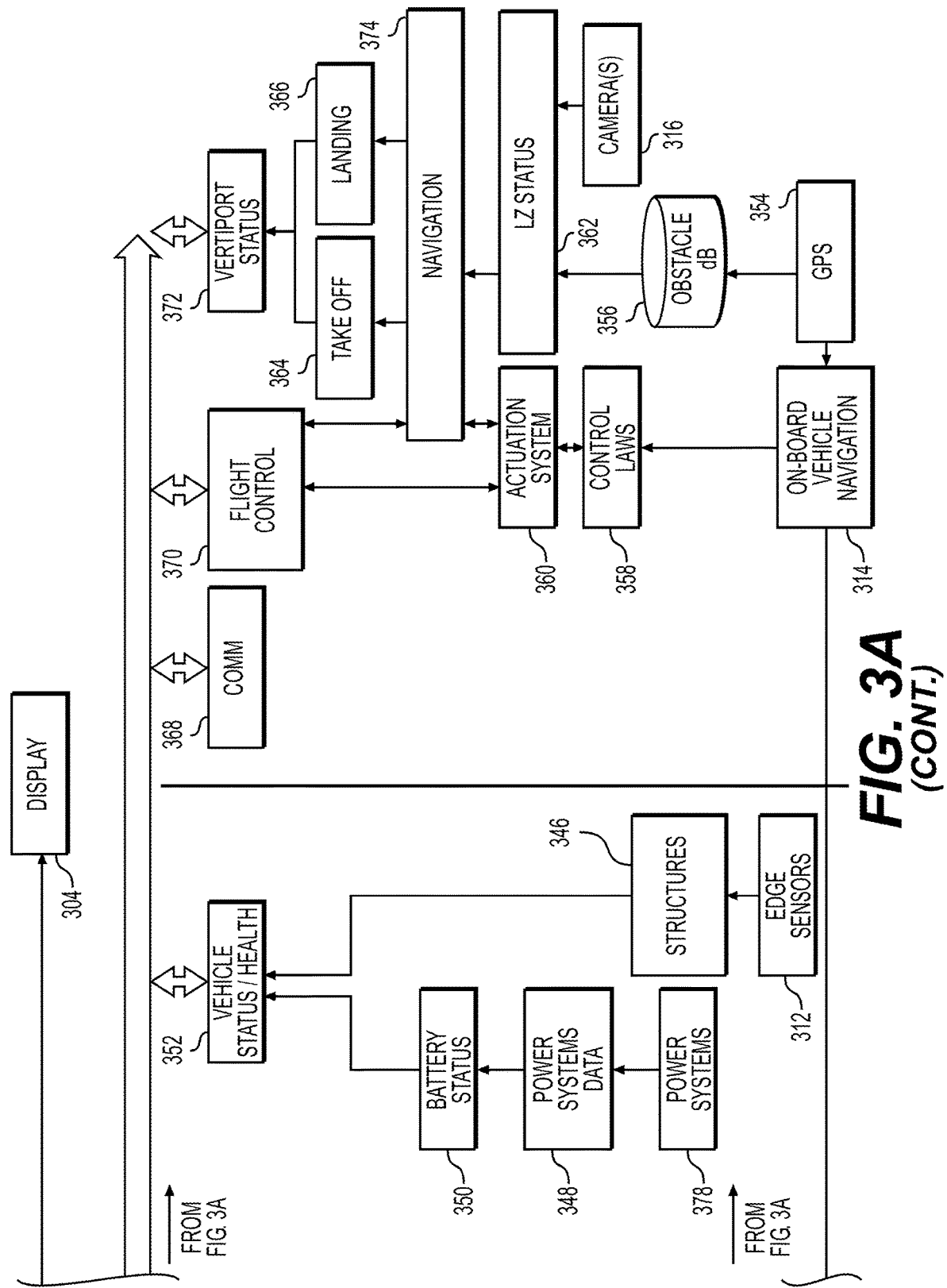
Figure 3B:
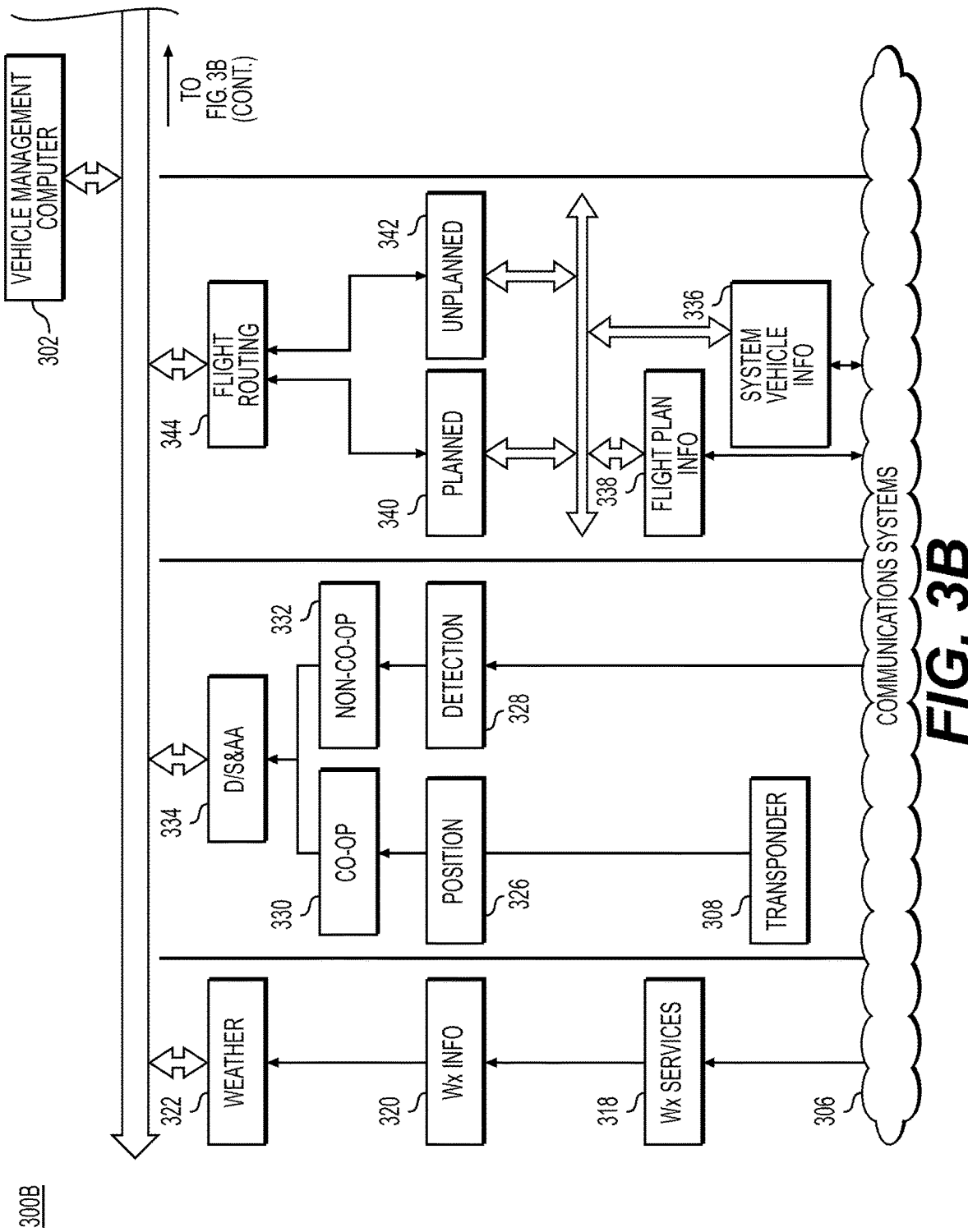
Figure 3B:
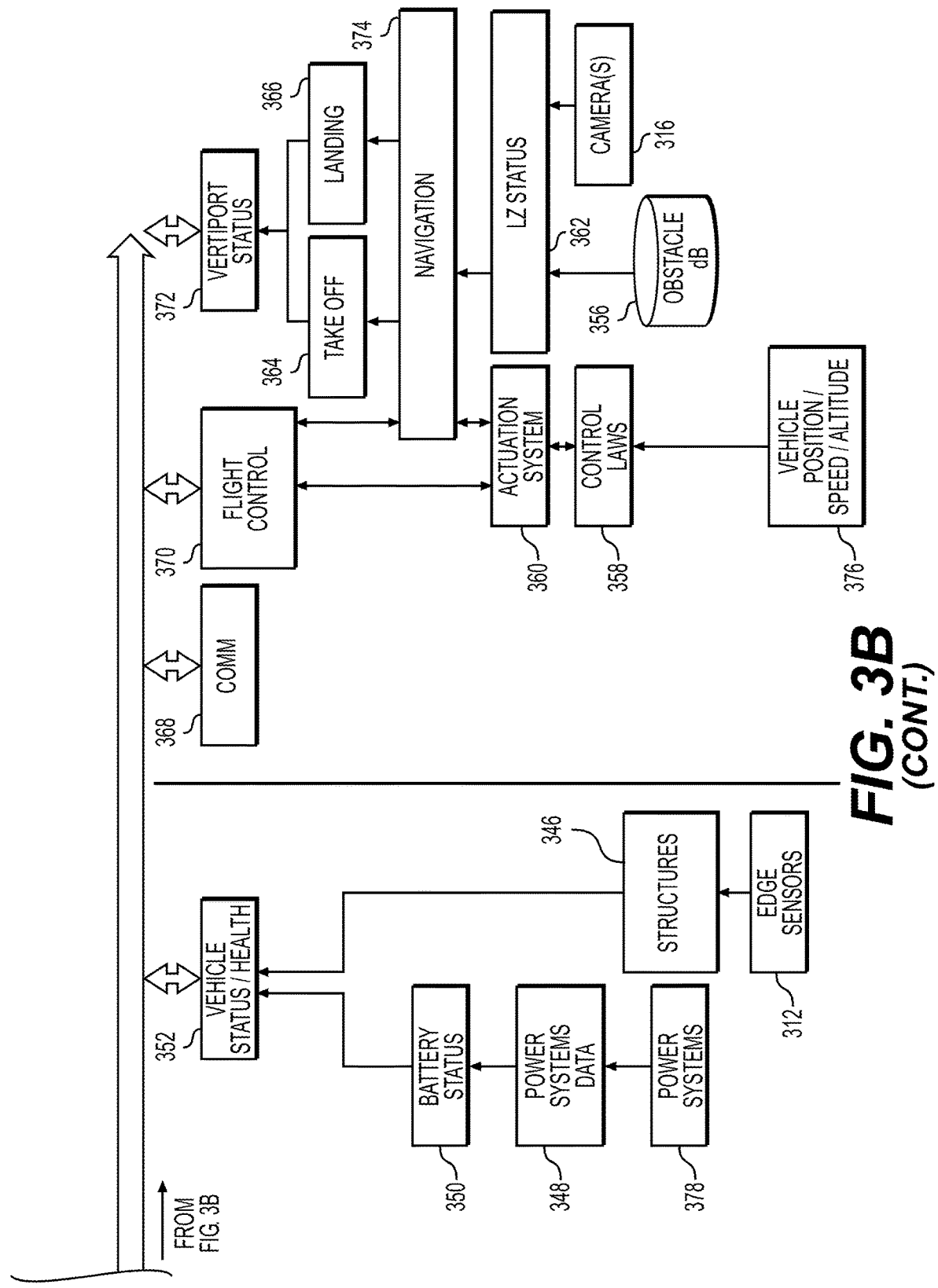

FIGS. 3A and 3B depict exemplary block diagrams of a vehicle of a system, according to one or more embodiments. FIG. 3A may depict a block diagram 300A and FIG. 3B may depict a block diagram 300B, respectively, of a vehicle, such as aircraft 131-133. Generally, the block diagram 300A may depict systems, information/data, and communications between the systems of a piloted or semi-autonomous vehicle, while the block diagram 300B may depict systems, information/data, and communications between the systems of a fully autonomous vehicle. The aircraft 131 may be one of the piloted or semi-autonomous vehicle and/or the fully autonomous vehicle.

The block diagram 300A of an aircraft 131 may include a vehicle management computer 302 and electrical, mechanical, and/or software systems (collectively, "vehicle systems"). The vehicle systems may include: one or more display(s) 304; communications systems 306; one or more transponder(s) 308; pilot/user interface(s) 324 to receive and communicate information from pilots and/or users 310 of the aircraft 131; edge sensors 312 on structures 346 of the aircraft 131 (such as doors, seats, tires, etc.); power systems 378 to provide power to actuation systems 360; camera(s) 316; GPS systems 354; on-board vehicle navigation systems 314; flight control computer 370; and/or one or more data storage systems. The vehicle management computer 302 and the vehicle systems may be connected by one or a combination of wired or wireless communication interfaces, such as TCP/IP communication over Wi-Fi or Ethernet (with or without switches), RS-422, ARINC-429, or other communication standards (with or without protocol switches, as needed).

The vehicle management computer 302 may include at least a network interface, a processor, and a memory, each coupled to each other via a bus or indirectly via wired or wireless connections (e.g., Wi-Fi, Ethernet, parallel or serial ATA, etc.). The memory may store, and the processor may execute, a vehicle management program. The vehicle management program may include a weather program 322, a Detect/Sense and Avoid (D/S & A) program 334, a flight routing program 344, a vehicle status/health program 352, a communications program 368, a flight control program 370, and/or a vertiport status program 372 (collectively, "sub-programs"). The vehicle management program may obtain inputs from the sub-programs and send outputs to the sub-programs to manage the aircraft 131, in accordance with program code of the vehicle management program. The vehicle management program may also obtain inputs from the vehicle systems and output instructions/data to the vehicle systems, in accordance with the program code of the vehicle management program.

The vehicle management computer 302 may transmit instructions/data/graphical user interface(s) to the one or more display(s) 304 and/or the pilot/user interface(s) 324. The one or more display(s) 304 and/or the pilot/user interface(s) 324 may receive user inputs, and transmit the user inputs to the vehicle management computer 302.

The communications systems 306 may include various data links systems (e.g., satellite communications systems), cellular communications systems (e.g., LTE, 4G, 5G, etc.), radio communications systems (e.g., HF, VHF, etc.), and/or wireless local area network communications systems (e.g., Wi-Fi, Bluetooth, etc.). The communications systems 306 may enable communications, in accordance with the communications program 368, between the aircraft 131 and external networks, services, and the cloud service 205, discussed above. An example of the external networks may include a wide area network, such as the internet. Examples of the services may include weather information services 318, traffic information services, etc.

The one or more transponder(s) 308 may include an interrogator system. The interrogator system of the aircraft 131 may be an ADS-B, a Mode S transponder, and/or other transponder system. The interrogator system may have an omnidirectional antenna and/or a directional antenna (interrogator system antenna). The interrogator system antenna may transmit/receive signals to transmit/receive interrogation messages and transmit/receive identification messages. For instance, in response to receiving an interrogation message, the interrogator system may obtain an identifier of the aircraft 131 and/or transponder aircraft data (e.g., speed, location, track, etc.) of the aircraft 131, e.g., from the on-board vehicle navigation systems 314; and transmit an identification message. Contra-wise, the interrogator system may transmit interrogation messages to nearby aircraft; and receive identification messages. The one or more transponder(s) 308 may send messages to the vehicle management computer 302 to report interrogation messages and/or identification messages received from/transmitted to other aircraft and/or the ground station(s) 215. As discussed above, the interrogation messages may include an identifier of the interrogator system (in this case, the aircraft 131), request the nearby aircraft to transmit an identification message, and/or (different than above) transponder aircraft data (e.g., speed, location, track, etc.) of the aircraft 131; the identification message may include an identifier of the aircraft 131 and/or the transponder aircraft data of the aircraft 131.

The edge sensors 312 on the structures 346 of the aircraft 131 may be sensors to detect various environmental and/or system status information. For instance, some of the edge sensors 312 may monitor for discrete signals, such as edge sensors on seats (e.g., occupied or not), doors (e.g., closed or not), etc. of the aircraft 131. Some of the edge sensors 312 may monitor continuous signals, such as edge sensors on tires (e.g., tire pressure), brakes (e.g., engaged or not, amount of wear, etc.), passenger compartment (e.g., compartment air pressure, air composition, temperature, etc.), support structure (e.g., deformation, strain, etc.), etc., of the aircraft 131. The edge sensors 312 may transmit edge sensor data to the vehicle management computer 302 to report the discrete and/or continuous signals.

The power systems 378 may include one or more battery systems, fuel cell systems, and/or other chemical power systems to power the actuation systems 360 and/or the vehicle systems in general. In one aspect of the disclosure, the power systems 378 may be a battery pack. The power systems 378 may have various sensors to detect one or more of temperature, fuel/electrical charge remaining, discharge rate, etc. (collectively, power system data 348). The power systems 378 may transmit power system data 348 to the vehicle management computer 302 so that power system status 350 (or battery pack status) may be monitored by the vehicle status/health program 352.

The actuation systems 360 may include: motors, engines, and/or propellers to generate thrust, lift, and/or directional force for the aircraft 131; flaps or other surface controls to augment the thrust, lift, and/or directional force for the aircraft 131; and/or aircraft mechanical systems (e.g., to deploy landing gear, windshield wiper blades, signal lights, etc.). The vehicle management computer 302 may control the actuation systems 360 by transmitting instructions, in accordance with the flight control program 370, and the actuation systems 360 may transmit feedback/current status of the actuation systems 360 to the vehicle management computer 302 (which may be referred to as actuation systems data).

The camera(s) 316 may include inferred or optical cameras, LIDAR, or other visual imaging systems to record internal or external environments of the aircraft 131. The camera(s) 316 may obtain inferred images; optical images; and/or LIDAR point cloud data, or any combination thereof (collectively "imaging data"). The LIDAR point cloud data may include coordinates (which may include, e.g., location, intensity, time information, etc.) of each data point received by the LIDAR. The camera(s) 316 and/or the vehicle management computer 302 may include a machine vision function. The machine vision function may process the obtained imaging data to detect objects, locations of the detected objects, speed/velocity (relative and/or absolute) of the detected objects, size and/or shape of the detected objects, etc. (collectively, "machine vision outputs"). For instance, the machine vision function may be used to image a landing zone to confirm the landing zone is clear/unobstructed (a landing zone (LZ) status 362). Additionally or alternatively, the machine vision function may determine whether physical environment (e.g., buildings, structures, cranes, etc.) around the aircraft 131 and/or on/near the routes 141 may be or will be (e.g., based on location, speed, flight plan of the aircraft 131) within a safe flight envelope of the aircraft 131. The imaging data and/or the machine vision outputs may be referred to as "imaging output data." The camera(s) 316 may transmit the imaging data and/or the machine vision outputs of the machine vision function to the vehicle management computer 302. The camera(s) 316 may determine whether elements detected in the physical environment are known or unknown based on obstacle data stored in an obstacle database 356, such as by determining a location of the detected object and determining if an obstacle in the obstacle database has the same location (or within a defined range of distance). The imaging output data may include any obstacles determined to not be in the obstacle data of the obstacle database 356 (unknown obstacles information).

The GPS systems 354 may include one or more global navigation satellite (GNSS) receivers. The GNSS receivers may receive signals from the United States developed Global Position System (GPS), the Russian developed Global Navigation Satellite System (GLONASS), the European Union developed Galileo system, and/or the Chinese developed BeiDou system, or other global or regional satellite navigation systems. The GNSS receivers may determine positioning information for the aircraft 131. The positioning information may include information about one or more of position (e.g., latitude and longitude, or Cartesian coordinates), altitude, speed, heading, or track, etc. for the vehicle. The GPS systems 354 may transmit the positioning information to the on-board vehicle navigation systems 314 and/or to the vehicle management computer 302.

The on-board vehicle navigation systems 314 may include one or more radar(s), one or more magnetometer(s), an attitude heading reference system (AHRS), and/or one or more air data module(s). The one or more radar(s) may be weather radar(s) to scan for weather and/or light weight digital radar(s), such as DAPA radar(s) (either omnidirectional and/or directional), to scan for terrain/ground/objects/obstacles. The one or more radar(s) may obtain radar information. The radar information may include information about the local weather and the terrain/ground/objects/obstacles (e.g., aircraft or obstacles and associated locations/movement). The one or more magnetometer(s) may measure magnetism to obtain bearing information for the aircraft 131. The AHRS may include sensors (e.g., three sensors on three axes) to obtain attitude information for the aircraft 131. The attitude information may include roll, pitch, and yaw of the aircraft 131. The air data module(s) may sense external air pressure to obtain airspeed information for the aircraft 131. The radar information, the bearing information, the attitude information, airspeed information, and/or the positioning information (collectively, navigation information) may be transmitted to the vehicle management computer 302.

The weather program 322 may, using the communications systems 306, transmit and/or receive weather information from one or more of the weather information services 318. For instance, the weather program 322 may obtain local weather information from weather radars and the on-board vehicle navigation systems 314, such as the air data module(s). The weather program may also transmit requests for weather information 320. For instance, the request may be for weather information 320 along a route 141 of the aircraft 131 (route weather information). The route weather information may include information about precipitation, wind, turbulence, storms, cloud coverage, visibility, etc. of the external environment of the aircraft 131 along/near a flight path, at a destination and/or departure location (e.g., one of the hubs 111-117), or for a general area around the flight path, destination location, and/or departure location. The one or more of the weather information services 318 may transmit responses that include the route weather information. Additionally or alternatively, the one or more of the weather information services 318 may transmit update messages to the aircraft 131 that includes the route weather information and/or updates to the route weather information.

The D/S & A program 334 may, using the one or more transponders 308 and/or the pilot/user interface(s) 324, detect and avoid objects that may pose a potential threat to the aircraft 131. As an example, the pilot/user interface(s) 324 may receive user input(s) from the pilots and/or users of the vehicle 310 (or radar/imaging detection) to indicate a detection of an object; the pilot/user interface(s) 324 (or radar/imaging detection) may transmit the user input(s) (or radar or imaging information) to the vehicle management computer 302; the vehicle management computer 302 may invoke the D/S & A program 334 to perform an object detection process 328 to determine whether the detected object is a non-cooperative object 332 (e.g., it is an aircraft that is not participating in transponder communication); optionally, the vehicle management computer 302 may determine a position, speed, track for the non-cooperative object 332 (non-cooperative object information), such as by radar tracking or image tracking; in response to determining the object is a non-cooperative object 332, the vehicle management computer 302 may determine a course of action, such as instruct the flight control program 370 to avoid the non-cooperative object 332. As another example, the one or more transponder(s) 308 may detect an intruder aircraft (such as intruder aircraft 230) based on an identification message from the intruder aircraft; the one or more transponder(s) 308 may transmit a message to the vehicle management computer 302 that includes the identification message from the intruder aircraft; the vehicle management computer 302 may extract an identifier and/or transponder aircraft data from the identification message to obtain the identifier and/or speed, location, track, etc. of the intruder aircraft; the vehicle management computer 302 may invoke the D/S & A program 334 to perform a position detection process 326 to determine whether the detected object is a cooperative object 330 and its location, speed, heading, track, etc.; in response to determining the object is a cooperative object 330, the vehicle management computer 302 may determine a course of action, such as instruct the flight control program 370 to avoid the cooperative object 330. For instance, the course of action may be different or the same for non-cooperative and cooperative objects 330/332, in accordance with rules based on regulations and/or scenarios.

The flight routing program 344 may, using the communications systems 306, generate/receive flight plan information 338 and receive system vehicle information 336 from the cloud service 205. The flight plan information 338 may include a departure location (e.g., one of the hubs 111-117), a destination location (e.g., one of the hubs 111-117), intermediate locations (if any) (e.g., waypoints or one or more of the hubs 111-117) between the departure and destination locations, and/or one or more routes 141 to be used (or not used). The system vehicle information 336 may include other aircraft positioning information for other aircraft with respect to the aircraft 131 (called a "receiving aircraft 131" for reference). For instance, the other aircraft positioning information may include positioning information of the other aircraft. The other aircraft may include: all aircraft 131-133 and/or intruder aircraft 230; aircraft 131-133 and/or intruder aircraft 230 within a threshold distance of the receiving aircraft 131; aircraft 131-133 and/or intruder aircraft 230 using a same route 141 (or is going to use the same route 141 or crossing over the same route 141) of the receiving aircraft; and/or aircraft 131-133 and/or intruder aircraft 230 within a same geographic area (e.g., city, town, metropolitan area, or sub-division thereof) of the receiving aircraft.

The flight routing program 344 may determine or receive a planned flight path 340. The flight routing program 344 may receive the planned flight path 340 from another aircraft 131 or the cloud service 205 (or other service, such as an operating service of the aircraft 131). The flight routing program 344 may determine the planned flight path 340 using various planning algorithms (e.g., flight planning services on-board or off-board the aircraft 131), aircraft constraints (e.g., cruising speed, maximum speed, maximum/minimum altitude, maximum range, etc.) of the aircraft 131, and/or external constraints (e.g., restricted airspace, noise abatement zones, etc.). The planned/received flight path may include flight coordinates, a flight path based on waypoints, any suitable flight path for the aircraft 131, or any combination thereof, in accordance with the flight plan information 338 and/or the system vehicle information 336. The flight coordinates may include 3-D coordinates of space (e.g., latitude, longitude, and altitude) for a flight path and time coordinate.

The flight routing program 344 may determine an unplanned flight path 342 based on the planned flight path 340 and unplanned event triggers, and using the various planning algorithms, the aircraft constraints of the aircraft 131, and/or the external constraints. The vehicle management computer 302 may determine the unplanned event triggers based on data/information the vehicle management compute 302 receives from other vehicle systems or from the cloud service 205. The unplanned event triggers may include one or a combination of: (1) emergency landing, as indicated by the vehicle status/health program 352 discussed below or by a user input to one or more display(s) 304 and/or the pilot/user interface(s) 324; (2) intruder aircraft 230, cooperative object 330, or non-cooperative object 332 encroaching on a safe flight envelope of the aircraft 131; (3) weather changes indicated by the route weather information (or updates thereto); (4) the machine vision outputs indicating a portion of the physical environment may be or will be within the safe flight envelope of the aircraft 131; and/or (5) the machine vision outputs indicating a landing zone is obstructed.

Collectively, the unplanned flight path 342/the planned flight path 340 and other aircraft positioning information may be called flight plan data.

The vehicle status/health program 352 may monitor vehicle systems for status/health, and perform actions based on the monitored status/health, such as periodically report status/health, indicate emergency status, etc. The vehicle may obtain the edge sensor data and the power system data 348. The vehicle status/health program 352 may process the edge sensor data and the power system data 348 to determine statuses of the power system 378 and the various structures and systems monitored by the edge sensors 312, and/or track a health of the power system 378 and structures and systems monitored by the edge sensors 312. For instance, the vehicle status/health program 352 may obtain the power systems data 348; determine a battery status 350; and perform actions based thereon, such as reduce consumption of non-essential systems, report battery status, etc. The vehicle status/health program 352 may determine an emergency landing condition based on one or more of the power system 378 and structures and systems monitored by the edge sensors 312 has a state that indicates the power system 378 and structures and systems monitored by the edge sensors 312 has or will fail soon. Moreover, the vehicle status/health program 352 may transmit status/health data to the cloud service 205 as status/health messages (or as a part of other messages to the cloud service). The status/health data may include the actuation systems data, all of the edge sensor data and/or the power system data, portions thereof, summaries of the edge sensor data and the power system data, and/or system status indicators (e.g., operating normal, degraded wear, inoperable, etc.) based on the edge sensor data and the power system data.

The flight control program 370 may control the actuation system 360 in accordance with the unplanned flight path 342/the planned flight path 340, the other aircraft positioning information, control laws 358, navigation rules 374, and/or user inputs (e.g., of a pilot if aircraft 131 is a piloted or semi-autonomous vehicle). The flight control program 370 may receive the planned flight path 340/unplanned flight path 342 and/or the user inputs (collectively, "course"), and determine inputs to the actuation system 360 to change speed, heading, attitude of the aircraft 131 to match the course based on the control laws 358 and navigation rules 374. The control laws 358 may dictate a range of actions possible of the actuation system 360 and map inputs to the range of actions to effectuate the course by, e.g., physics of flight of the aircraft 131. The navigation rules 374 may indicate acceptable actions based on location, waypoint, portion of flight path, context, etc. (collectively, "circumstance"). For instance, the navigation rules 374 may indicate a minimum/maximum altitude, minimum/maximum speed, minimum separation distance, a heading or range of acceptable headings, etc. for a given circumstance.

The vertiport status program 372 may control the aircraft 131 during take-off (by executing a take-off process 364) and during landing (by executing a landing process 366). The take-off process 364 may determine whether the landing zone from which the aircraft 131 is to leave and the flight environment during the ascent is clear (e.g., based on the control laws 358, the navigation rules 374, the imaging data, the obstacle data, the unplanned flight path 342/the planned flight path 340, the other aircraft positioning information, user inputs, etc.), and control the aircraft or guide the pilot through the ascent (e.g., based on the control laws 358, the navigation rules 374, the imaging data, the obstacle data, the flight plan data, user inputs, etc.). The landing process 366 may determine whether the landing zone on which the aircraft 131 is to land and the flight environment during the descent is clear (e.g., based on the control laws 358, the navigation rules 374, the imaging data, the obstacle data, the flight plan data, user inputs, the landing zone status, etc.), and control the aircraft or guide the pilot through the descent (e.g., based on the control laws 358, the navigation rules 374, the imaging data, the obstacle data, the flight plan data, user inputs, the landing zone status, etc.).

The one or more data storage systems may store data/information received, generated, or obtained onboard the aircraft. The one or more data storage systems may also store software for one or more of the computers onboard the aircraft.

The block diagram 300B may be the same as the block diagram 300A, but the block diagram 300B may omit the pilot/user interface(s) 324 and/or the one or more displays 304, and include a vehicle position/speed/altitude system 376. The vehicle position/speed/altitude system 376 may include or not include the on-board vehicle navigation systems 314 and/or the GPS systems 354, discussed above. In the case that the vehicle position/speed/altitude system 376 does not include the on-board vehicle navigation systems 314 and/or the GPS systems 354, the vehicle position/speed/altitude system 376 may obtain the navigation information from the cloud service 205.

In some aspects of the disclosure, guidance information may be determined for aircraft 131 to guide the aircraft 131 to a charging station. As described above, a hub, such as any one of 111-117 of FIG. 1, may be a ground facility where the aircraft 131 may take off, land, or remained parked (e.g., airport, vertiport, heliport, vertistop, helistop, temporary landing/takeoff facility, or the like). In some embodiments, a hub may have one or more charging stations where the aircraft 131 may initiate a charging event. As will be described in further detail below, guidance information may be determined to guide aircraft 131 to such charging stations.

Figure 4:
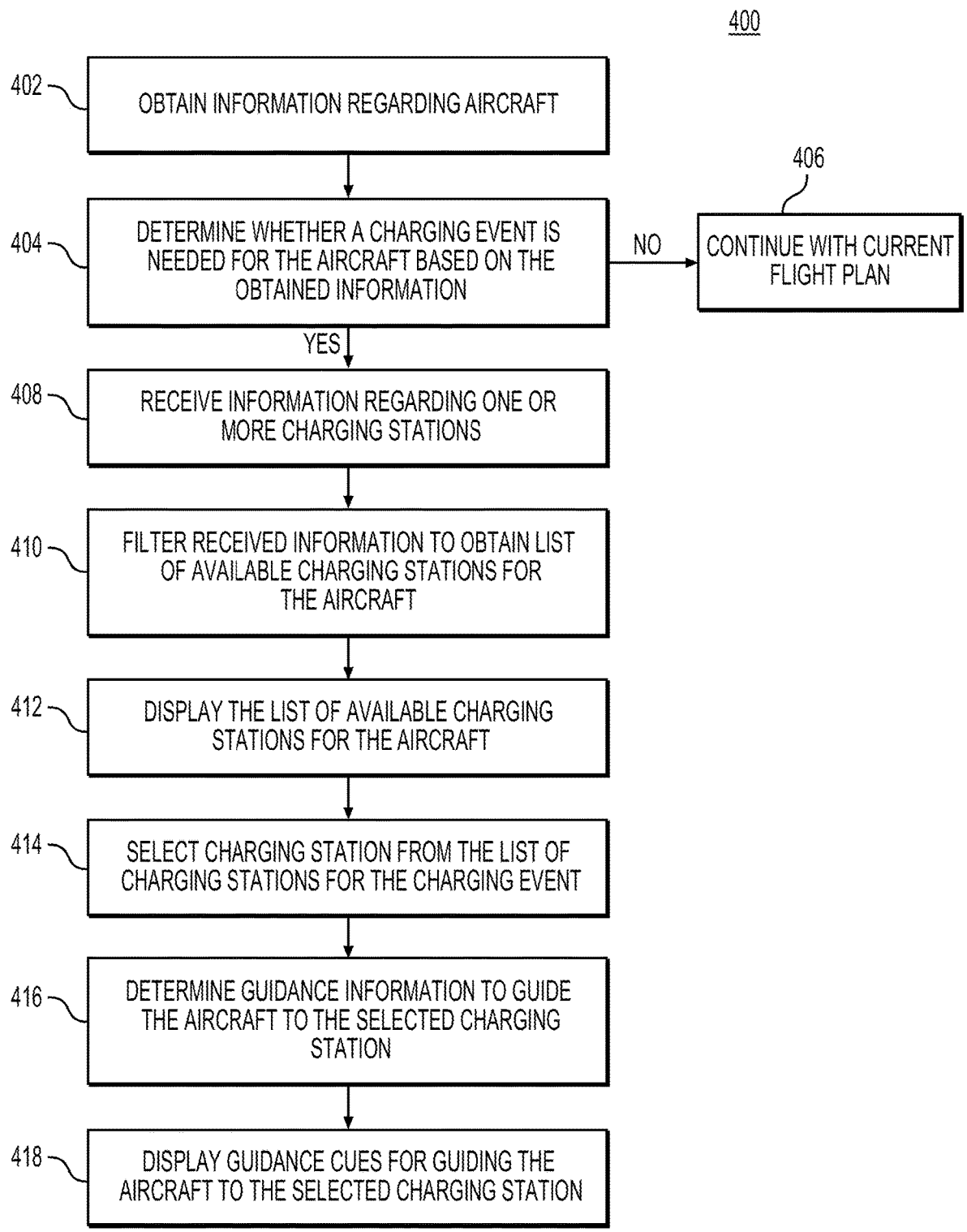
FIG. 4 depicts a flowchart of a method for determining guidance information for vehicles, according to one or more embodiments.

FIG. 4 depicts a flowchart of a method 400 for determining guidance information for vehicles, according to one or more embodiments. In some embodiments, the method 400 may be performed by one or more processors onboard the aircraft 131, cloud service 205 in communication with the aircraft 131, and/or one or more ground station(s) 215 in communication with the aircraft 131.

Method 400 may begin with step 402 in which information regarding the aircraft 131 may be obtained by the one or more processors. In some embodiments, the information may include a load factor for the aircraft 131, e.g., the number of passengers on the aircraft 131. In some embodiments, the load factor may be provided by a crew member on the aircraft 131. In some embodiments, the load factor may be detected by one or more sensors onboard the aircraft 131. In some embodiments, the information may include data from a battery management system (BMS) of the aircraft. The BMS of the aircraft 131 may monitor parameters of the aircraft 131 battery system. For example, the BMS may monitor parameters such as the voltage, current, charge level, temperature, etc. of the battery system, and protect the battery system from operating outside its safe operating conditions. In such embodiments, the BMS may provide such parameters regarding the vehicle battery system, e.g., charge level, temperature, etc. In some embodiments, the information may include a current flight plan and/or a future flight plan for the aircraft 131. It is understood that the one or more processors may obtain information regarding the aircraft 131 as described above with reference to FIGS. 1-3B. For example, the one or more processors may obtain information regarding weather constraints, spatial restrictions (e.g., buildings), and temporary flight restrictions (TFR) for the aircraft 131, as described above with reference to FIG. 1. As another example, the one or more processors may obtain information about one or more intruder aircrafts from a cloud service, one or more communications station(s), and/or one or more ground station(s) 215, as described above with reference to FIG. 2. As yet another example, the one or more processors may obtain information from any combination of the components described above with reference to FIGS. 3A-3B, e.g., one or more display(s), communications systems, one or more transponder(s), pilot/user interface(s) to receive and communicate information from pilots and/or users of the aircraft, edge sensors on structures of the aircraft (such as doors, seats, tires, etc.), power systems to provide power to actuation systems, camera(s), GPS systems, on-board vehicle navigation systems, flight control computer, one or more data storage systems, and/or vehicle management computer.

In step 404, the one or more processors may determine whether a charging event is needed based on the obtained information. For example, the one or more processors may determine a state of charge of the battery system based on the obtained information and determine whether there is enough charge complete the current and/or future flight plan.

If the one or more processors determine that there is enough charge to complete the current and/or future flight plan, the method 400 moves on to step 406 in which the one or more processors may continue in accordance with the current flight plan.

If the one or more processors determine that there is not enough charge to complete the current and/or future flight plan, the method moves on to step 408 in which information regarding one or more charging stations may be received by the one or more processors. In some embodiments, information regarding the one or more charging stations may be received from database(s) associated one or more hubs, such as any one or more of 111-117 of FIG. 1, a ground station, and/or onboard system of the aircraft 131. In some embodiments, the information may include an indication of the distance from the aircraft 131 to each of the charging stations located at each of the one or more hubs. In some embodiments, the information may include an indication of how many charging stations are located at each of the one or more hubs. In such embodiments, the information may also include an indication of how many of the charging stations at each of the one or more hubs are available to the aircraft 131. For example, the information may include an indication that some of the charging stations are occupied by other aircrafts and/or that some of the charging stations have been reserved by other aircrafts for an upcoming charging event. In some embodiments, the information may include details about each of the one or more charging stations. For example, the details about each of the one or more charging stations may include a make and/or manufacturer of the charging station. The details about each of the one or more charging stations may include the location and orientation of the charging interface within the charging station. In the context of the current disclosure, the term charging interface may be used interchangeably with charging port and charge connector. It is understood that a charging port on a vehicle, e.g., an aircraft, is designed to conductively transfer charge current from an external source, e.g., charging station, to the vehicle and that a charge connector of the external source, e.g., charging station, is configured to electrically connect to the charging port to transfer charge current to the vehicle. It is also understood that the location and type of the charging port on a vehicle may vary based on the model and manufacturer. Similarly, the location and the type of charge connector of a charging station may also vary based on the model and manufacturer. For example, the physical, electrical, communication protocol, and performance requirements for the charging port and charge connector may vary based on the model and manufacturer.

In step 410, the one or more processors may filter the received information to obtain a list of available charging stations for the aircraft 131. In some embodiments, the received information may be categorized and filtered based on: make/manufacturer, compatibility of the charging station with the aircraft 131, and/or distance to the aircraft 131. For example, the one or more processors may filter the received information to obtain a list of charging stations for the aircraft 131 that are within a predetermined range of the aircraft 131. As another example, the one or more processors may filter the received information to obtain a list of charging stations for the aircraft 131 that are not occupied or reserved by another vehicle. As another example, the one or more processors may filter the received information to obtain a list of charging stations for the aircraft 131 that have the same make and/or manufacturer. As yet another example, the one or more processors may determine a compatibility between the charging stations by comparing the physical, electrical, communication protocol, and performance requirements of each of the charging stations with that of the aircraft 131.

In step 412, the one or more processors may cause display of the list of available charging stations for the aircraft 131, e.g., on the one or more display(s) 304 described above with reference to FIG. 3A.

In step 414, the one or more processors may select a charging station from the list of available charging stations for the charging event. In some embodiments, the one or more processors may receive a selection from an operator of the aircraft 131, e.g., via pilot/user interface(s) 324 described above with reference to FIG. 3A. In some embodiments, the one or more processors may select a charging station based on a distance to the aircraft 131 if a selection is not made by the operator within a predetermined period of time. For example, the one or more processors may select a charging station that is closest in distance to the aircraft if a selection is not made within the predetermined period of time.

In step 416, the one or more processors may determine guidance information to guide the aircraft 131 to the selected charging station. In some embodiments, the one or more processors may determine a current location of the aircraft 131 and determine guidance information to the selected charging station based on the current location. In some embodiments, the one or more processors may determine the charging interface location on the aircraft 131 and the charging interface location on the selected charging station. In such embodiments, the one or more processors may determine guidance information to align the charging interface of the aircraft 131 with the charging interface of the selected charging station. For example, the one or more processors may determine a distance of movement, a change in direction, and/or a degree of rotation by the aircraft to align the charging interface of the vehicle with the charging interface of the selected charging station.

Figure 5:
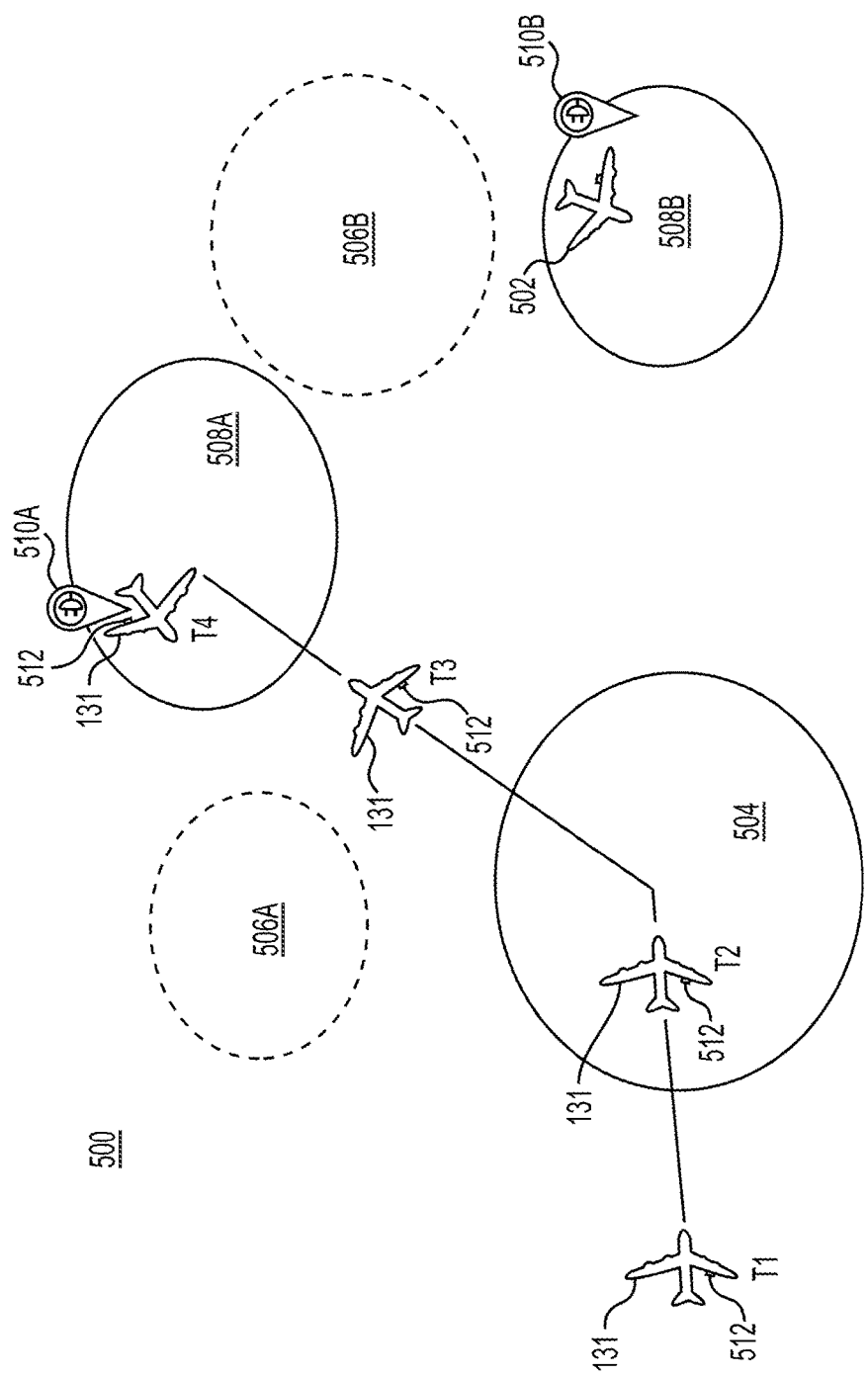
FIG. 5 depicts an example environment in which methods, systems, and other aspects of the present disclosure may be implemented.

For example, with reference to FIG. 5 depicting an environment an airspace 500 with a hub 504 and several charging stations 506A-506B, 508A-508B, the one or more processors may determine a current location of the aircraft 131 at a certain point in time, T1. At T1, the one or more processors may determine guidance information to the selected charging station 508A based on the current location of the aircraft 131. The one or more processors may determine that the aircraft 131 should continue on a current flight plan and fly at a heading of 45 degrees at a future point in time, T2. The one or more processor may further determine that when the aircraft 131 is flying at a heading of 45 degrees, the aircraft 131 may need to rotate 220 degrees at a future point in time, T3, in order to align a charging interface 512 of the aircraft 131 with a charging interface 510A of the selected charging station 508A. Accordingly, the aircraft 131 may be aligned within the selected charging station 508A at time, T4, in order to initiate the charging event.

As shown in FIG. 5, the hub 504 may have one or more charging stations 506A-B, 508A-B. As indicated by the dotted lines in FIG. 5, charging stations 506A-B may have been determined to be incompatible with the aircraft 131 as described above with reference to step 410. As indicate by the solid line in FIG. 5, charging station 508B with charging interface 510B may have been determined to be compatible with the aircraft 131 as describe above with reference to step 410, but may have been determined to be unavailable to the aircraft 131 as it is occupied by another vehicle 502.

It is understood that the guidance information may be generated and/or generated guidance information may be adjusted based on information regarding the aircraft 131, as described above with reference to FIGS. 1-3B. For example, the guidance information may be generated and/or adjusted based on information regarding weather constraints, spatial restrictions (e.g., buildings), and temporary flight restrictions (TFR) for the aircraft 131, as described above with reference to FIG. 1. As another example, the guidance information may be generated and/or adjusted based on information about one or more intruder aircrafts from a cloud service, one or more communications station(s), and/or one or more ground station(s) 215, as described above with reference to FIG. 2. As yet another example, the guidance information may be generated and/or adjusted based on information from any combination of the components described above with reference to FIGS. 3A-3B, e.g., one or more display(s), communications systems, one or more transponder(s), pilot/user interface(s) to receive and communicate information from pilots and/or users of the aircraft, edge sensors on structures of the aircraft (such as doors, seats, tires, etc.), power systems to provide power to actuation systems, camera(s), GPS systems, on-board vehicle navigation systems, flight control computer, one or more data storage systems, and/or vehicle management computer.

In step 418, the one or more processors may cause display of guidance cues, e.g., on the one or more display(s) 304 described above with reference to FIG. 3A, to guide the aircraft 131 to the selected charging station. In some embodiments, the guidance cues may be triggered based on the guidance information determined in step 416. For example, with reference to FIG. 5, at time T1, the one or more processors may cause display of a guidance cue for the aircraft 131 to continue on a current flight plan. At time T2, the one or more processors may cause display of a guidance cue for the aircraft 131 to fly at a heading of 45 degrees. At time T3, the one or more processors may cause display of a guidance cue for the aircraft 131 to rotate 220 degrees to align the charging interface 512 of the aircraft 131 with the charging interface 510A of the selected charging station 508A. At time T4, the one or more processors may cause display of a guidance cue for the aircraft 131 to make slight adjustments in order to connect the charging interface 512 of the aircraft 131 to the charging interface 510A of the selected charging station 508A and initiate the charging event. In some embodiments, the one or more processor may further communicate such cues via visual output devices (e.g., one or more display(s) 304), acoustic/audio output devices of the vehicle (e.g., buzzer, speakers), and/or mechanical devices of the vehicle (e.g., steering wheel, keyboard, touch screen, and pointing devices such as joystick, trackball, etc.). In some embodiments, an operator of the aircraft 131 may manually align the aircraft 131 with the charging station 508A based on the guidance cues. In some embodiments, the aircraft 131 may automatically change course and align the aircraft 131 with the charging station 508A based on the guidance cues. For example, the aircraft 131 may automatically start flying at a heading of 45 degrees at time T2, rotate 220 degrees at time T3, and make minor adjustments at time T4 to connect the charging interface 512 of the aircraft 131 to the charging interface 510A of the charging station 508A.

Figure 6:
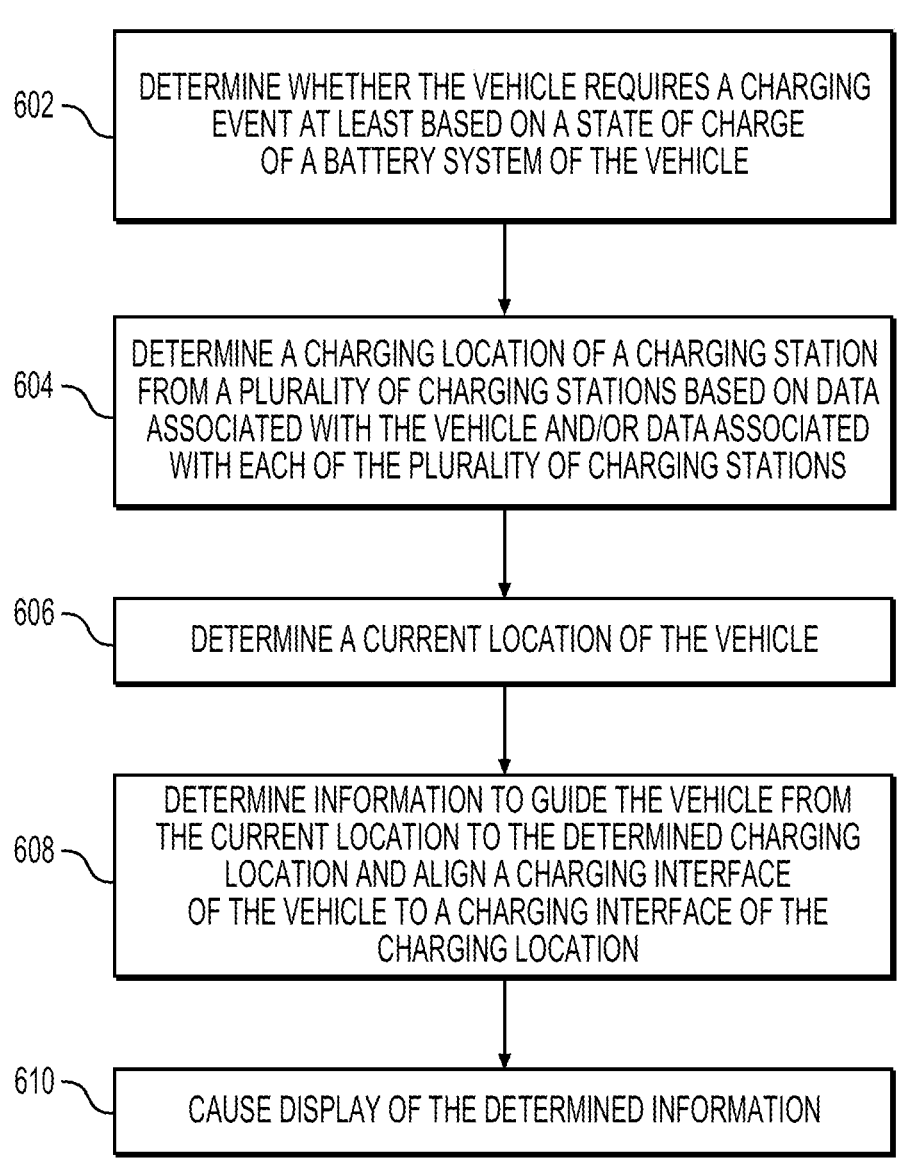
FIG. 6 depicts a flowchart of a method for determining guidance information for vehicles, according to one or more embodiments.

FIG. 6 depicts a flowchart of a method 600 of determining guidance information for a vehicle, according to one or more embodiments. In some embodiments, the method 600 may be performed by one or more processors onboard the aircraft 131, cloud service 205 in communication with the aircraft 131, and/or one or more ground station(s) 215 in communication with the aircraft 131.

Method 600 may begin with step 602 in which the one or more processors may determine whether the vehicle (e.g., aircraft 131) requires a charging event at least based on a state of charge of a battery system of the vehicle. In some embodiments, the one or more processors may determine the state of charge of the battery system of the vehicle based on information from a battery management system of the vehicle and/or a number of passengers on the vehicle. In such embodiments, method 600 may further include the steps of receiving information regarding a next destination for the vehicle; determining a distance to be traveled by the vehicle to the next destination; and determining whether the vehicle requires the charging event based on the determined state of charge of the battery system and the determined distance.

In step 604, the one or more processors may determine, as a result of determining that the vehicle requires the charging event, a charging location of a charging station from a plurality of charging stations based on data associated with the vehicle and/or data associated with each of the plurality of charging stations. In some embodiments, determining the charging location of a charging station from a plurality of charging stations based on data associated with the vehicle and/or data associated with each of the plurality of charging stations may include determining information regarding the plurality of charging stations, wherein each charging station includes one or more charging locations; determining one or more charging locations for the charging event based on charging compatibility with the vehicle and/or distance to the vehicle; and causing display of the determined one or more charging locations for the charging event. In such embodiments, method 600 may include a further step in which the one or more processors may determine the charging location of a charging station from a plurality of charging stations based on data associated with the vehicle and/or data associated with each of the plurality of charging stations by: (i) receiving a selection of one of the displayed one or more charging locations for the charging event or (ii) determining, after a predetermined period of time, one of the displayed one or more charging locations for the charging event that is closest in distance to the vehicle.

In step 606, the one or more processors may determine a current location of the vehicle.

In step 608, the one or more processors may determine information to guide the vehicle from the current location to the determined charging location and align a charging interface of the vehicle to a charging interface of the charging location. In some embodiments, determining information to guide the vehicle from the current location to the determined charging location and align a charging interface of the vehicle with a charging interface of the charging location may include: determining a location of the charging interface on the vehicle; and determining a distance of movement, a change in direction, and/or a degree of rotation by the vehicle to align the charging interface of the vehicle with the charging interface of the charging location.

In step 610, the one or more processors may cause display of the determined information.

Figure 7:
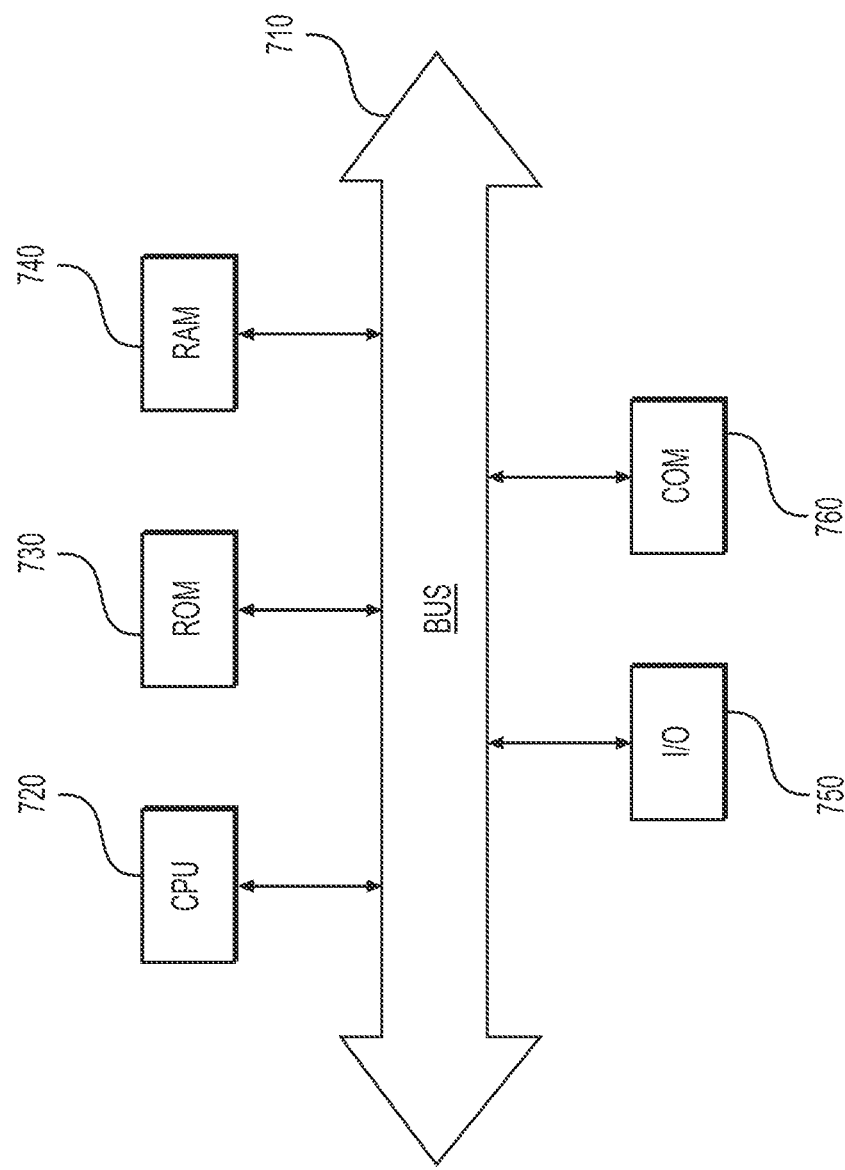
FIG. 7 depicts an example system that may execute techniques presented herein.

FIG. 7 depicts an example system that may execute techniques presented herein. FIG. 7 is a simplified functional block diagram of a computer that may be configured to execute techniques described herein, according to exemplary embodiments of the present disclosure. Specifically, the computer (or "platform" as it may not be a single physical computer infrastructure) may include a data communication interface 760 for packet data communication. The platform may also include a central processing unit ("CPU") 720, in the form of one or more processors, for executing program instructions. The platform may include an internal communication bus 710, and the platform may also include a program storage and/or a data storage for various data files to be processed and/or communicated by the platform such as ROM 730 and RAM 740, although the system 700 may receive programming and data via network communications. The system 700 also may include input and output ports 750 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of determining guidance information for a vehicle, the method comprising:
    determining, by one or more processors, whether the vehicle requires a charging event at least based on a state of charge of a battery system of the vehicle;
    as a result of determining that the vehicle requires the charging event, determining, by the one or more processors, a charging location of a charging station from a plurality of charging stations based on data associated with the vehicle and/or data associated with each of the plurality of charging stations;
    determining, by the one or more processors, a current location of the vehicle;
    determining, by the one or more processors, a location of a vehicle charging interface on the vehicle;
    receiving from a database, by the one or more processors, a location of a charging interface on a charging location;
    determining, by the one or more processors, information to guide the vehicle from the current location to the determined charging location and align and connect the vehicle charging interface of the vehicle to the charging interface of the charging location to allow conductive transfer of electric current from the charging interface of the charging location to the vehicle charging interface of the vehicle, wherein the information to align the vehicle charging interface of the vehicle to the charging interface of the charging location is determined based at least in part on:
        (i.) a comparison of at least a portion of the data associated with the vehicle to at least a portion of the data associated with the determined charging station of the plurality of charging station,
        (ii.) the location of the vehicle charging interface on the vehicle, and
        (iii.) the location of the charging interface on the charging location;
    generating, via the one or more processors, one or more vehicle guidance instructions based at least in part on the information determined by the one or more processors based on the comparison of the at least a portion of the data associated with the vehicle to the at least a portion of the data associated with the determined charging station; and
    causing, by the one or more processors, display of the determined information.

2. The method of claim 1, further comprising:
    determining the state of charge of the battery system of the vehicle based on information from a battery management system of the vehicle and/or a number of passengers on the vehicle.

3. The method of claim 2, further comprising:
    receiving information regarding a next destination for the vehicle;
    determining a distance to be traveled by the vehicle to the next destination; and
    determining whether the vehicle requires the charging event based on the determined state of charge of the battery system and the determined distance.

4. The method of claim 1, wherein determining the charging location of a charging station from a plurality of charging stations based on data associated with the vehicle and/or data associated with each of the plurality of charging stations comprises:
    determining information regarding the plurality of charging stations, wherein each charging station includes one or more charging locations;
    determining one or more charging locations for the charging event based on charging compatibility with the vehicle and/or distance to the vehicle; and
    causing display of the determined one or more charging locations for the charging event.

5. The method of claim 4, further comprising:
    determining the charging location of a charging station from a plurality of charging stations based on data associated with the vehicle and/or data associated with each of the plurality of charging stations by receiving a selection of one of the displayed one or more charging locations for the charging event.

6. The method of claim 4, further comprising:
    determining the charging location of a charging station from a plurality of charging stations based on data associated with the vehicle and/or data associated with each of the plurality of charging stations by determining, after a predetermined period of time, one of the displayed one or more charging locations for the charging event that is closest in distance to the vehicle.

7. The method of claim 1, wherein determining information to guide the vehicle from the current location to the determined charging location and align the vehicle charging interface of the vehicle with the charging interface of the charging location comprises:
    determining a location of the vehicle charging interface on the vehicle; and
    determining a distance of movement, a change in direction, and/or a degree of rotation by the vehicle to align the vehicle charging interface of the vehicle with the charging interface of the charging location.

8. A system for determining guidance information for a vehicle, the system comprising:
    a memory storing instructions; and
    one or more processors executing the instructions to perform a process including:
        determining whether the vehicle requires a charging event at least based on a state of charge of a battery system of the vehicle;
        as a result of determining that the vehicle requires the charging event, determining a charging location of a charging station from a plurality of charging stations based on data associated with the vehicle and/or data associated with each of the plurality of charging stations;

determining a current location of the vehicle;
receiving from a database a location of a vehicle charging interface on the vehicle;
receiving from a database a location of a charging interface on a charging location;
determining information to guide the vehicle from the current location to the determined charging location and align and connect the vehicle charging interface of the vehicle to the charging interface of the charging location to allow conductive transfer of electric current from the charging interface of the charging location to the vehicle charging interface of the vehicle, wherein the information to align the vehicle charging interface of the vehicle to the charging interface of the charging location is determined based at least in part on:
  (i.) a comparison of at least a portion of the data associated with the vehicle to at least a portion of the data associated with the determined charging station of the plurality of charging station,
  (ii.) the location of the vehicle charging interface on the vehicle, and
  (iii.) the location of the charging interface on the charging location;
generating, via the one or more processors, one or more vehicle guidance instructions based at least in part on the information determined by the one or more processors based on the comparison of the at least a portion of the data associated with the vehicle to the at least a portion of the data associated with the determined charging station; and
causing display of the determined information.

9. The system of claim 8, wherein the process further includes:
determining the state of charge of the battery system of the vehicle based on information from a battery management system of the vehicle and/or a number of passengers on the vehicle.

10. The system of claim 9, wherein the process further includes:
receiving information regarding a next destination for the vehicle;
determining a distance to be traveled by the vehicle to the next destination; and
determining whether the vehicle requires the charging event based on the determined state of charge of the battery system and the determined distance.

11. The system of claim 8, wherein determining the charging location of a charging station from a plurality of charging stations based on data associated with the vehicle and/or data associated with each of the plurality of charging stations comprises:
determining information regarding the plurality of charging stations, wherein each charging station includes one or more charging locations;
determining one or more charging locations for the charging event based on charging compatibility with the vehicle and/or distance to the vehicle; and
causing display of the determined one or more charging locations for the charging event.

12. The system of claim 11, wherein the process further includes:
determining the charging location of a charging station from a plurality of charging stations based on data associated with the vehicle and/or data associated with each of the plurality of charging stations by receiving a selection of one of the displayed one or more charging locations for the charging event.

13. The system of claim 11, wherein the process further includes:
determining the charging location of a charging station from a plurality of charging stations based on data associated with the vehicle and/or data associated with each of the plurality of charging stations by determining, after a predetermined period of time, one of the displayed one or more charging locations for the charging event that is closest in distance to the vehicle.

14. The system of claim 13, wherein determining information to guide the vehicle from the current location to the determined charging location and align the vehicle charging interface of the vehicle with the charging interface of the charging location comprises:
determining a location of the vehicle charging interface on the vehicle; and
determining a distance of movement, a change in direction, and/or a degree of rotation by the vehicle to align the vehicle charging interface of the vehicle with the charging interface of the charging location.

15. A non-transitory computer-readable medium storing instructions that, when executed by one or more processors, cause the one or more processors to perform a method for determining guidance information for a vehicle, the method comprising:
determining whether the vehicle requires a charging event at least based on a state of charge of a battery system of the vehicle;
as a result of determining that the vehicle requires the charging event, determining a charging location of a charging station from a plurality of charging stations based on data associated with the vehicle and/or data associated with each of the plurality of charging stations;
determining a current location of the vehicle;
receiving from a database a location of a vehicle charging interface on the vehicle;
receiving from a database a location of a charging interface on a charging location;
determining information to guide the vehicle from the current location to the determined charging location and align and connect the vehicle charging interface of the vehicle to the charging interface of the charging location to allow conductive transfer of electric current from the charging interface of the charging location to the vehicle charging interface of the vehicle, wherein the information to align the vehicle charging interface of the vehicle to the charging interface of the charging location is determined based at least in part on:
  (i.) a comparison of at least a portion of the data associated with the vehicle to at least a portion of the data associated with the determined charging station of the plurality of charging station,
  (ii.) the location of the vehicle charging interface on the vehicle, and
  (iii.) the location of the charging interface on the charging location;
generating, via the one or more processors, one or more vehicle guidance instructions based at least in part on the information determined by the one or more processors based on the comparison of the at least a portion of the data associated with the vehicle to the at least a portion of the data associated with the determined charging station; and
causing display of the determined information.

16. The non-transitory computer-readable medium of claim 15, wherein the method further comprises:
   determining the state of charge of the battery system of the vehicle based on information from a battery management system of the vehicle and/or a number of passengers on the vehicle.

17. The non-transitory computer-readable medium of claim 16, wherein the method further comprises:
   receiving information regarding a next destination for the vehicle;
   determining a distance to be traveled by the vehicle to the next destination; and
   determining whether the vehicle requires the charging event based on the determined state of charge of the battery system and the determined distance.

18. The non-transitory computer-readable medium of claim 15, wherein determining the charging location of a charging station from a plurality of charging stations based on data associated with the vehicle and/or data associated with each of the plurality of charging stations comprises:
   determining information regarding the plurality of charging stations, wherein each charging station includes one or more charging locations;
   determining one or more charging locations for the charging event based on charging compatibility with the vehicle and/or distance to the vehicle; and
   causing display of the determined one or more charging locations for the charging event.

19. The non-transitory computer-readable medium of claim 18, wherein the method further comprises:
   determining the charging location of a charging station from a plurality of charging stations based on data associated with the vehicle and/or data associated with each of the plurality of charging stations by receiving a selection of one of the displayed one or more charging locations for the charging event; or
   determining the charging location of a charging station from a plurality of charging stations based on data associated with the vehicle and/or data associated with each of the plurality of charging stations by determining, after a predetermined period of time, one of the displayed one or more charging locations for the charging event that is closest in distance to the vehicle.

20. The non-transitory computer-readable medium of claim 15, wherein determining information to guide the vehicle from the current location to the determined charging location and align the vehicle charging interface of the vehicle with the charging interface of the charging location comprises:
   determining a location of the vehicle charging interface on the vehicle; and
   determining a distance of movement, a change in direction, and/or a degree of rotation by the vehicle to align the vehicle charging interface of the vehicle with the charging interface of the charging location.

21. The method of claim 1, wherein the vehicle is an aircraft, and wherein the method further comprises:
   generating updated route data associated with an updated route defined between the current location of the vehicle and the charging location of the charging station; and
   transmitting the updated route data to an external computing entity associated with an aircraft traffic monitoring system.

22. The method of claim 1, further comprising:
   retrieving, via the one or more processors, the data associated with each of the plurality of charging stations, wherein the data associated with each of the plurality of charging stations being defined at least in part by data identifying a respective charging interface configuration for each of the plurality of charging stations; and
   identifying the charging station from the plurality of charging stations based at least in part on a determination that the respective charging interface configuration defined by the charging interface of the charging station is functionally compatible with a vehicle charging interface configuration defined by the vehicle charging interface of the vehicle.

23. The system of claim 8, wherein the vehicle is an aircraft, and wherein the process further comprises:
   generating updated route data associated with an updated route defined between the current location of the vehicle and the charging location of the charging station; and
   transmitting the updated route data to an external computing entity associated with an aircraft traffic monitoring system.

24. The system of claim 8, wherein the process further comprises:
   retrieving, via the one or more processors, the data associated with each of the plurality of charging stations, wherein the data associated with each of the plurality of charging stations being defined at least in part by data identifying a respective charging interface configuration for each of the plurality of charging stations; and
   identifying the charging station from the plurality of charging stations based at least in part on a determination that the respective charging interface configuration defined by the charging interface of the charging station is functionally compatible with a vehicle charging interface configuration defined by the vehicle charging interface of the vehicle.

25. The non-transitory computer-readable medium of claim 15, wherein the vehicle is an aircraft, and wherein the method further comprises:
   generating updated route data associated with an updated route defined between the current location of the vehicle and the charging location of the charging station; and
   transmitting the updated route data to an external computing entity associated with an aircraft traffic monitoring system.

26. The non-transitory computer-readable medium of claim 15, wherein the method further comprises:
   retrieving, via the one or more processors, the data associated with each of the plurality of charging stations, wherein the data associated with each of the plurality of charging stations being defined at least in part by data identifying a respective charging interface configuration for each of the plurality of charging stations; and
   identifying the charging station from the plurality of charging stations based at least in part on a determination that the respective charging interface configuration defined by the charging interface of the charging station is functionally compatible with a vehicle charging interface configuration defined by the vehicle charging interface of the vehicle.

* * * * *